(12) United States Patent
Bussmann et al.

(10) Patent No.: US 8,161,718 B2
(45) Date of Patent: Apr. 24, 2012

(54) SELF-PROPELLED AGRICULTURAL WORKING MACHINE

(75) Inventors: Christoph Bussmann, Harsewinkel (DE); Andreas Wilken, Bissendorf (DE); Joachim Baumgarten, Beelen (DE); Georg Eggenhaus, Saerbeck (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 95 days.

(21) Appl. No.: 12/267,753

(22) Filed: Nov. 10, 2008

(65) Prior Publication Data
US 2009/0126327 A1    May 21, 2009

(30) Foreign Application Priority Data
Nov. 16, 2007 (DE) .................. 10 2007 055 074

(51) Int. Cl.
*A01D 41/127* (2006.01)
(52) U.S. Cl. .............................. 56/10.2 G; 701/50
(58) Field of Classification Search .............. 56/10.2 R, 56/10.2 G, 10.2 H; 701/50
See application file for complete search history.

(56) References Cited

U.S. PATENT DOCUMENTS

| | | | | |
|---|---|---|---|---|
| 5,455,769 A | * | 10/1995 | Panoushek et al. | 701/50 |
| 5,488,817 A | * | 2/1996 | Paquet et al. | 56/10.2 R |
| 5,666,793 A | * | 9/1997 | Bottinger | 56/10.2 R |
| 5,995,895 A | * | 11/1999 | Watt et al. | 701/50 |
| 6,119,442 A | * | 9/2000 | Hale | 56/10.2 H |
| 6,834,484 B2 | | 12/2004 | Coers et al. | |
| 7,630,809 B2 | * | 12/2009 | Behnke et al. | 701/50 |
| 2006/0123757 A1 | | 6/2006 | Baumgarten | |

FOREIGN PATENT DOCUMENTS

| DE | 10 2004 059 543 | 6/2006 |
|---|---|---|
| EP | 1 321 025 | 6/2003 |

\* cited by examiner

*Primary Examiner* — Alicia Torres
(74) *Attorney, Agent, or Firm* — Michael J. Striker

(57) ABSTRACT

In a self-propelled agricultural working machine having working units whose working parameters are adjustable, moving at a ground speed that is regulated automatically as a function of at least one crop-material parameter and/or one working parameter of the working machine using a forward-travel regulator, and having at least one control, operating, and display unit, with which the crop-material parameters and/or the working parameters of the working machine may be adjusted and displayed, the operator of the working machine has access to information regarding the state of the forward-travel regulator when the ground speed is being regulated using a forward-travel regulator. For this purpose, the crop-material parameter and/or working parameter of the working machine that currently limits the ground-speed control via the forward-travel regulator is displayed directly to the operator of the working machine in the control, operating, and display unit.

19 Claims, 3 Drawing Sheets

US 8,161,718 B2

SELF-PROPELLED AGRICULTURAL WORKING MACHINE

CROSS-REFERENCE TO RELATED APPLICATION

The invention described and claimed hereinbelow is also described in German Patent Application DE 10 2007 055 074.1 filed on Nov. 16, 2007. This German Patent Application, whose subject matter is incorporated here by reference, provides the basis for a claim of priority of invention under 35 U.S.C. 119(a)-(d).

BACKGROUND OF THE INVENTION

The present invention relates to a self-propelled agricultural working machine.

Publication EP 1 321 025 A1 discloses a self-propelled agricultural working machine designed as a combine harvester with an automatic control unit for regulating the forward-travel speed. The control unit changes the forward-travel speed to control the throughput of the combine harvester and is activated as soon as a layer-thickness detector detects the arrival of crop material in a conveying device of the combine harvester.

Publication DE 10 2004 059 543 A1 submitted by the present applicant makes known a self-propelled agricultural working machine with which the ground speed is regulated using a forward-travel regulator as a function of different operating situations and based on different driving strategies. The advantages and mode of operation of regulating ground speed using a forward-travel regulator are described in the German patent application mentioned above, so their features are incorporated via reference in this application.

Investigations in practical application have shown that a ground-speed control using a forward-travel regulator in order to control the throughput of the self-propelled agricultural working machine is limited by different crop-material parameters and/or working parameters of the working machine. For example, when crop-material stands are very thin, the throughput quantity would decrease, and the forward-travel regulator would inevitably increase the ground speed. To ensure the driving stability and, therefore, the safety of the working machine, the working machine may only be operated at a certain maximum speed when it is performing work. When the increase in ground speed reaches the maximum permissible working speed, the forward-travel regulator is unable to increase the ground speed further. Since the operator of the working machine now notices that the desired throughput does not correspond to the current target throughput, he will attempt to modify the working parameters of the working machine in accordance with the current throughput to prevent a negative effect on the working result. To do this requires a great deal of technical knowledge on the part of the operator, however. In addition, the maximum permissible working speed is only one of a plurality of limiting features for the ground-speed control using the forward-travel regulator. The operator is therefore faced with the problem of not knowing which working parameters of the working machine he should advantageously modify in order to obtain an optimum working result.

SUMMARY OF THE INVENTION

The object of the present invention is to avoid the disadvantages of the related art described above, and, in particular, to refine a self-propelled agricultural working vehicle such that the operator of the working machine is provided with information—in a targeted manner—regarding the state of the forward-travel regulator when ground-speed control is carried out using a forward-travel regulator.

In keeping with this object and with others which will become apparent hereinafter, one feature of the present resides, briefly stated, in a self-propelled agricultural working machine, comprising working units with adjustable working parameters; a forward-travel regulator for regulating a ground speed of the working machine automatically as a function of at least one parameter selected from the group consisting of a crop-material parameter, a working parameter of the working machine, and both; at least one control, operating, and display unit with which said at least one parameter is adjustable, configured such that said at least one parameter that currently limits a ground-speed control via said forward-travel regulator is displayed directly to an operator of the working machine in said control, operating, and display unit.

Given that the crop-material parameter and/or the working parameter of the working machine that currently limits the ground speed via the forward-travel regulator is displayed directly to the operator of the working machine in the control, operating, and display unit, the operator always receives the information—in an up-to-date and targeted manner—regarding which crop-material parameter and/or working parameter of the working machine has a limiting effect on the ground-speed control of the forward-travel regulator, thereby enabling him to make a decision specifically as to whether he should adapt individual working parameters to the changed ground speed and, therefore, to the changed crop-material throughput, or whether he should leave the settings unchanged, since the effects to be expected on the working result of the working machine are not that serious.

To enable the different limiting crop-material parameters and/or working parameters of the working machine to be displayed quickly and in a manner that is intuitively understood by the operator, it is provided in an advantageous refinement of the present invention that the crop-material parameter and/or the working parameter of the working machine that currently limits the ground-speed control via the forward-travel regulator is displayed as a pictogram in the control, operating, and display unit. In this context, "display" refers, e.g., to depicting in a display located in the working machine and/or to activating related warning lights. The display and warning lights are elements of the control, operating, and display unit.

To enable the different limiting crop-material parameters and/or working parameters of the working machine to be displayed to the operator quickly and easily, it is provided in an advantageous refinement of the present invention that the crop-material parameter and/or the working parameter of the working machine that currently limits the ground-speed control via the forward-travel regulator is displayed as a term in the control, operating, and display unit. In this context, "display" refers, e.g., to depicting in a display located in the working machine and/or to activating related warning lights. The display and warning lights are elements of the control, operating, and display unit.

It is also feasible, of course, for the crop-material parameter and/or working parameter of the working machine that currently limits the ground-speed control via the forward-travel regulator to be displayed to the operator as a pictogram and as a term in the control, operating, and display unit, thereby making it very easy for the operator to obtain this information in a targeted manner. As an alternative, he may select the form in which he wishes to have the information displayed by selecting a setting to this effect in the control, operating, and display unit.

In an advantageous embodiment, the crop-material parameter and/or working parameter of the working machine that limits the ground speed via the forward-travel regulator is displayed in a separate screen of the control, operating, and display unit, thereby making it easier for the operator to grasp the information. The operator grasps the information in a particularly rapid and intuitive manner when the separate screen covers further screens of the control, operating, and display unit at least part of the time and/or in at least certain areas, so that the information that is important to the operator at that time is placed in the foreground.

Advantageously, at least one lower control limit or an upper control limit, or a lower and an upper control limit may be defined for the at least one crop-material parameter and/or one working parameter of the working machine, so that the ground speed is controlled via the forward-speed regulator within clearly defined limits, which may depend on the safety and driving stability of the working machine, and on basic external conditions. With an advantageous embodiment, the particular control limits may be entered and/or changed using the control, operating, and display unit, thereby enabling the operator to define the control limits that he finds suitable, in an individualized manner.

In an advantageous refinement, in order to provide the operator of the working machine with information as to which crop-material parameter and/or working parameter has a limiting effect, but to also enable him to determine whether an optimal selection of the defined control limits has been made, the crop-material parameter and/or the working parameter of the working machine—and the control limits that were defined for the particular crop-material parameter and/or working parameter of the working machine—are displayed in the control, operating, and display unit that currently limits the ground-speed control via the forward-travel regulator.

In an advantageous embodiment of the present invention, the working parameter of the working machine that limits the ground-speed control via the forward-travel regulator is the ground speed, thereby ensuring that the driving stability and, therefore, the driving safety of the working machine is always ensured while it is being driven and operated.

In an advantageous embodiment of the present invention, the working parameter of the working machine that limits the ground-speed control via the forward-travel regulator is the engine load drop, thereby ensuring, e.g., that the engine does not become overloaded, and/or that the engine may be operated in the speed range in which the lowest possible fuel consumption is ensured. The control limits are then defined accordingly.

In an advantageous embodiment of the present invention, the working parameter of the working machine that limits the ground-speed control via the forward-travel regulator is the state of one or more working units and/or their working media, thereby ensuring, e.g., that the drive motor does not become overheated if there is an insufficient quantity of coolant in the engine cooling system, or, e.g., that a hydraulic pump does not run dry if the amount of hydraulic fluid in the system is insufficient, or, e.g., that the drive motor is not adequately lubricated if the temperature of the engine oil lies in a critical range. The examples listed here represent a large number of states of one or more working units and/or their working media that may limit the ground-speed control via the forward-speed regulator. "Working media" refers to the gasses and/or fluids required to operate the working units, e.g., compressed air, hydraulic fluid, lubricating oil, and/or coolant.

With an advantageous embodiment of the present invention, the working parameter of the working machine that limits the ground-speed control via the forward-travel regulator is the cleaning output of a crop-material cleaning device of the working machine, thereby making it possible—e.g., as soon as the cleaning-loss sensors detect that the losses due to cleaning are increasing in an undesired range—to limit the ground-speed control via the forward-travel regulator such that the ground speed does not increase further, in order to limit the quantity of crop material being loaded onto the cleaning sieves. In this case, the increase in the losses due to cleaning represents a large number of states that limit the cleaning output of a crop-material cleaning device.

With an advantageous embodiment of the present invention, the working parameter of the working machine that limits the ground-speed control via the forward-travel regulator is the separating output of a crop-material separating device of the working machine, thereby making it possible—e.g., as soon as the separating-loss sensors detect that the losses due to separation are increasing in an undesired range—to limit the ground-speed control via the forward-travel regulator such that the ground speed does not increase further, in order to limit the quantity of crop material being loaded onto the separating device. In this case, the increase in the losses due to separation represents a large number of states that limit the separating output of a crop-material separating device.

With an advantageous embodiment of the present invention, the working parameter of the working machine that limits the ground-speed control via the forward-travel regulator is a process of transferring the crop material to an external hauling vehicle. To prevent crop material losses during the process of transferring crop material to an external hauling vehicle, it is important for the working vehicle and the hauling vehicle to be driven at nearly the same ground speed, thereby making it possible for the crop material to be transferred in a targeted manner. Since the ground speed is therefore limited while crop material is being transferred, the forward-travel regulator is unable to perform ground-speed control, e.g., as a function of the crop material stand. As a result, the control is limited by the transfer process.

In an advantageous embodiment of the present invention, the working parameter of the working machine that limits the ground-speed control via the forward-travel regulator is the distance to the end or beginning of the row or field that is detected by the working machine, so that, when the distance to the end or beginning of the row or field detected by the working machine is short, the ground-speed control is limited via the forward-travel regulator such that, e.g., before the working machine enters a field or a row, the ground speed is not increased greatly via the forward-travel regulator, thereby preventing the case in which the working machine must be braked drastically as soon as the field or row begins. In addition, e.g., shortly before the end of the field or row, the ground speed does not diminish even when the quantity of crop material increases slightly, because the working vehicle would otherwise accelerate drastically at the end of the field or row. The distance that is detected therefore limits the ground-speed control via the forward-travel regulator.

With an advantageous embodiment of the present invention, the crop-material parameter that limits the ground-speed control via the forward-travel regulator is the crop-material throughput supplied to the working units of the working machine, so that, e.g., when a defined maximum quantity of crop material is reached, the forward-travel regulator does not increase the ground speed of the working machine any further, even though, e.g., the engine has further reserves. The crop-material throughput therefore limits the ground-speed control.

With an advantageous embodiment of the present invention, the crop-material parameter that limits the ground-speed control of the forward-travel regulator is the portion of crop grains contained in a tailings device of the working machine, so that, e.g., when the portion of crop grains in the tailings device increases beyond the defined control limit, the ground speed is not increased further via the forward-travel regulator, thereby ensuring that the portion of crop grains in the tailings device does not increase further.

With an advantageous embodiment of the present invention, the crop-material parameter that limits the ground-speed control of the forward-travel regulator is the volume of crop material contained in a tailings device of the working machine, so that, e.g., when the volume of crop material in the tailings device increases beyond the defined control limit, the ground speed is not increased further via the forward-travel regulator, thereby ensuring that the volume of crop material in the tailings device does not increase further.

With an advantageous embodiment of the present invention, the ground-speed control is always regulated automatically—via the forward-travel regulator—to a control limit based on the crop-material parameter or working parameter of the working machine that has the limiting effect. This means that the forward-travel regulator—despite having been limited due to a crop-material parameter and/or working parameter—always automatically attempts to adapt the ground speed of the working machine to the setpoint ground speed defined by the forward-travel regulator. In this case, the forward-travel regulator therefore continually regulates the ground speed "along" the control limit that results from the limiting process. When, e.g., the sieve load of the cleaning device is the limiting working parameter, the forward-travel regulator attempts to increase the ground speed again as soon as the limiting sieve load improves even slightly. The ground speed is therefore always based on the current sieve load of the cleaning device. The example described here represents a large number of control limits that the forward-travel regulator takes into account as the controlled variable for the ground-speed control.

In an advantageous embodiment, the self-propelled agricultural working machine is designed as a combine harvester.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
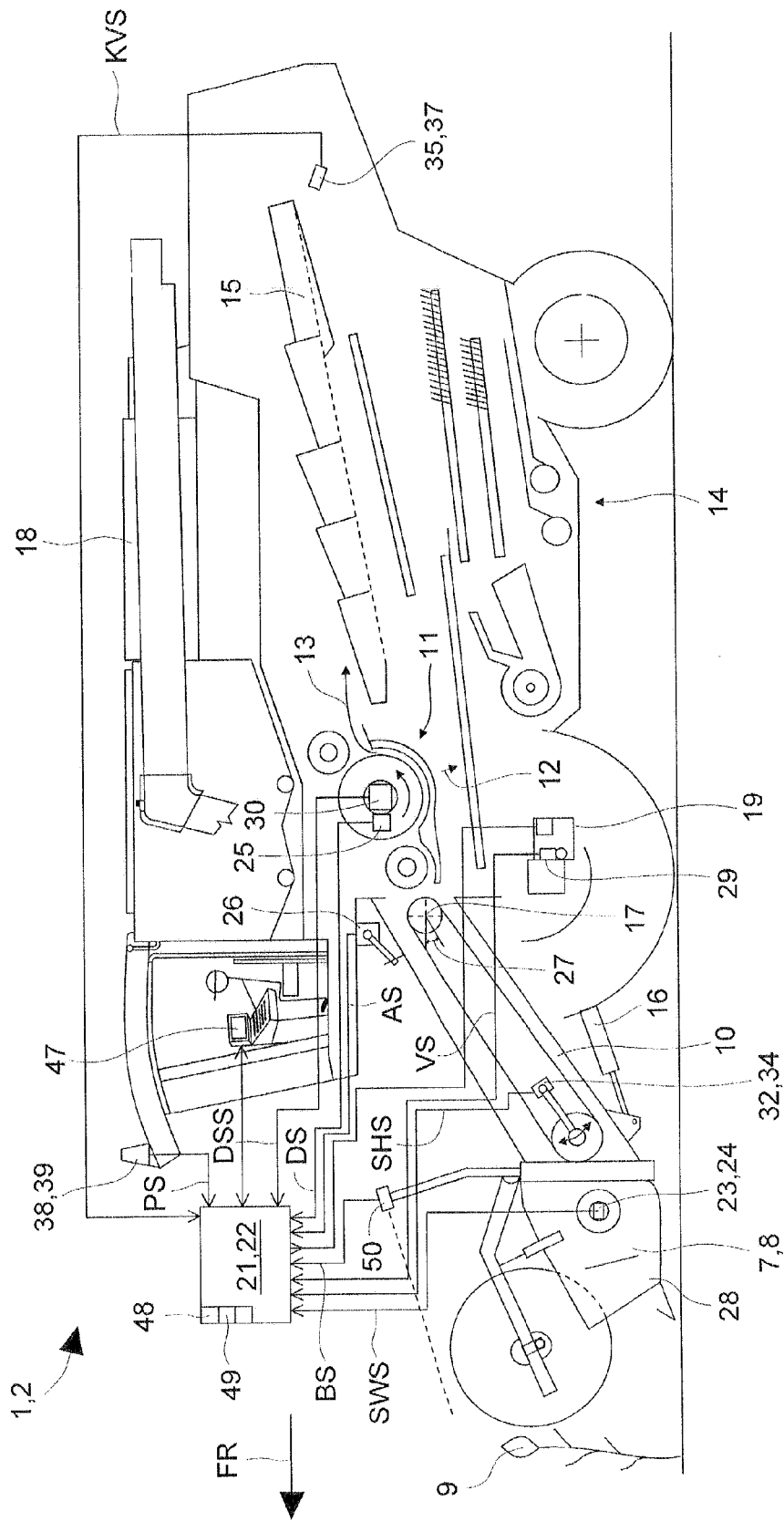
FIG. 1 shows a side view of a working machine designed as a combine harvester.

Self-propelled agricultural working machine 2 configured as a combine harvester 1 and shown in FIG. 1 includes a front attachment 8 designed as a header 7 that cuts crops 9 growing on the field and delivers them to a feed rake 10. Feed rake 10 transfers crop material 9 to a downstream threshing mechanism 11 that prepares crop material 9, dividing it into a grain-chaff mixture 12 and a stream of material 13 composed of threshed-out stalks. Grain-chaff mixture 12 is conveyed to a cleaning device 14 that separates the grain from the non-grain components, i.e., stalk and chaff parts. Stream of material 13 composed of threshed-out stalks arrives at a separating device designed as a tray-type shaker 15, which conveys stream of material 13 to the rear region of combine harvester 1 and thereby separates out the grain, short straw and chaff contained in stream of material 13, which is also delivered to cleaning device 14. It is within the scope of the present invention for the separating device to be designed as an axial rotor. It is also within the scope of the present invention for the threshing mechanism and the separating device to be designed as an interconnected axial rotor.

Feed rake 10 is guided via lifting cylinders 16—which are connected on the housing side to combine harvester 1 such that they are movable in a swinging manner, and are connected on the piston-rod side with feed rake 10 such that they are movable in a swinging manner—such that it is pivotable around a pivot axis 17 positioned transversely to direction of travel FR. Combine harvester 1 has an internal combustion engine 18 that drives a ground drive 19 for driving front wheels 20 of combine harvester 1, a threshing mechanism drive for driving threshing mechanism, and a header drive for driving header 7.

Ground drive 19 is equipped with a speed regulator that receives control signals from a forward-travel regulator 21, which automatically and continuously regulates the ground speed of combine harvester 1. Forward-travel regulator 21 includes a control and regulating unit 22 that is connected with a plurality of sensors 23, 25, 26, 29, 30, 34, 37, 39, 50 located on combine harvester 1 and header 7.

A crop sensor 50 is located on the front end of header 7, which senses the crop located in front of combine harvester 1 in direction of travel FR. Crop sensor 50 generates crop signals BS as a function of the amount of growth in the field. A further sensor 23 monitors an on/off switch 24 for threshing mechanism 11 and generates a threshing mechanism signal DS as a function of the operating status of threshing mechanism 11. A further sensor 25 monitors an on/off switch 24 for header 7 and generates a header signal SWS as a function of the operating status of header 7.

An angle-of-rotation sensor 26 is located in pivot axis 17 of feed rake 10 and detects, in a manner known per se, an angle of rotation 27 between feed rake 10 and combine harvester 1. At a certain angle of rotation 27, in which header 7 assumes a working position 28, angle-of-rotation sensor 26 generates a working position signal AS.

A rotational speed sensor 29 is located on ground drive 19; it detects, in a manner known per se, the ground speed and direction of travel FR of combine harvester 1. Rotational speed sensor 29 generates a ground-speed signal VS that is proportional to the ground speed when combine harvester 1 is traveling in a forward direction.

A throughput sensor 30 is located on the threshing mechanism drive in a manner known per se and detects a cylinder torque that is a function of the throughput of crop material through threshing mechanism 11. Throughput sensor 30 generates a throughput signal DSS that is proportional to the throughput of crop material through threshing mechanism 7.

Feed rake 10 includes a layer-thickness detector 32 that is known per se, which detects the thickness of the layer of crop material in feed rake 10. Layer-thickness detector 32 includes a sensor 34 that generates a layer-thickness signal SHS that is proportional to the thickness of the crop material layer.

A grain-flow measuring device 35 is located at the end of tray-type shaker 15, which senses a loss due to separation. Grain-flow measuring device 35 includes a plurality of knock sensors 37 that generate grain-loss signals KVS in a manner known per se, the grain-loss signals KVS being proportional to the loss due to separation. The combine harvester is also equipped with a position detector 38 that senses the position of combine harvester 1. Position detector 38 includes sensors 39 that generate a position signal PS that is a function of the location of combine harvester 1.

Control and regulating unit 22 compares the layer-thickness signals SHS generated by sensors 34 with a specified minimum layer thickness. If the determined layer thickness is equal to or greater than the minimum layer thickness, control and regulating unit 22 generates an "in-use" mode signal, which is transmitted to forward-travel regulator 21. When the "in-use" mode signal is received, forward-travel regulator 21 detects that combine harvester 1 is in the "in-use" mode. If forward-travel regulator 21 does not receive an "in-use" signal, forward-travel regulator 21 detects that the combine harvester is in the "non-use" mode.

To increase the quality of detection, an embodiment is feasible in which forward-travel regulator 21 detects, e.g., the "in-use" mode and the "non-use" mode only when further "in-use" mode signals are transmitted to forward-travel regulator 21.

Control and regulating unit 22 compares threshing mechanism signal DS generated by sensor 25 with a specified switch-on value and thereby determines the operating state of threshing mechanism 11. If threshing mechanism 11 is switched on, control and regulating unit 22 generates a first "in-use" mode signal.

It is also feasible that control and regulating unit 22 compares header signal SWS generated by sensor 23 with a switch-on value for header 7 and thereby determines the operating state of header 7. If header 7 is switched on, control and regulating unit 22 generates a second "in-use" mode signal.

It is also feasible that control and regulating unit 22 compares working position signal AS generated by angle-of-rotation sensor 26 with a specified working position value and thereby determines working position 28 of header 7. If header 7 is in working position 28, control and regulating unit 22 generates a third "in-use" mode signal.

It is also possible that control and regulating device 22 compares ground speed signals VS generated by rotational speed sensor 29 with a ground speed setpoint value and detects whether combine harvester 1 is traveling at a minimum ground speed. If the ground speed of combine harvester 1 is equal to or greater than the minimum ground speed, control and regulating unit 22 generates a fourth "in-use" mode signal.

In a further embodiment of the present invention, it is feasible that forward-travel regulator 21 is connected via control and regulating unit 22 with crop sensor 50, and forward-travel regulator 21 detects—as a function of crop signals BS generated by crop sensor 50—whether combine harvester 1 is traveling in the crop or outside the crop, i.e., whether combine harvester 1 is in the "non-use" mode or the "in-use" mode.

It is also feasible that forward-travel regulator 21 is connected with position detector 38, and that forward-travel regulator 21 detects—depending on the path already traveled, the cutting width of header 7 and a map of cutting areas—whether the combine harvester is in the "non-use" mode or the "in-use" mode. When forward-travel regulator 21 detects that combine harvester 1 is in the "in-use" mode, forward-travel regulator 21 regulates the ground speed as a function of a crop-material parameter, such as the losses due to separation determined by grain-flow measuring device 35 and/or a working parameter of combine harvester 1, such as the thickness of the layer of crop material in feed rake 10.

The driver uses a control, operating, and display unit 22, 47 connected with forward-travel regulator 21 to specify a grain-loss limit 48, with which forward-travel regulator 21 calculates a target layer thickness for feed rake 10. Forward-travel regulator 21 regulates the ground speed such that the layer thickness reaches calculated target layer thickness 49. Forward-travel regulator 21 compares the loss due to separation with grain-loss limit 48. If the loss due to separation is greater than grain-loss limit 48 for longer than a certain length of time, the ground speed is reduced until the loss due to separation corresponds to grain-loss limit 48 and, simultaneously, a new target layer thickness 49 is specified. If the loss due to separation is lower than grain-loss limit 48 for longer than a certain length of time, the ground speed is increased until the loss due to separation corresponds to grain-loss limit 48. Forward-travel regulator 21 updates the layer thickness by continually changing the ground speed during the "in-use" mode in order to adapt to the different harvesting conditions.

Since the automatic ground-speed control that is described above and is carried out via forward-travel regulator 21 to control the throughput of combine harvester 1 is limited by different crop-material parameters and/or working parameters, the operator is shown—in display unit 47 connected with control and regulating unit 22—the limiting elements and/or the limiting setting, and/or the limiting crop-material parameter 47, so that he may make the necessary changes to the settings of combine harvester 1 using control, operating, and display unit 22, 47.

Figure 2:
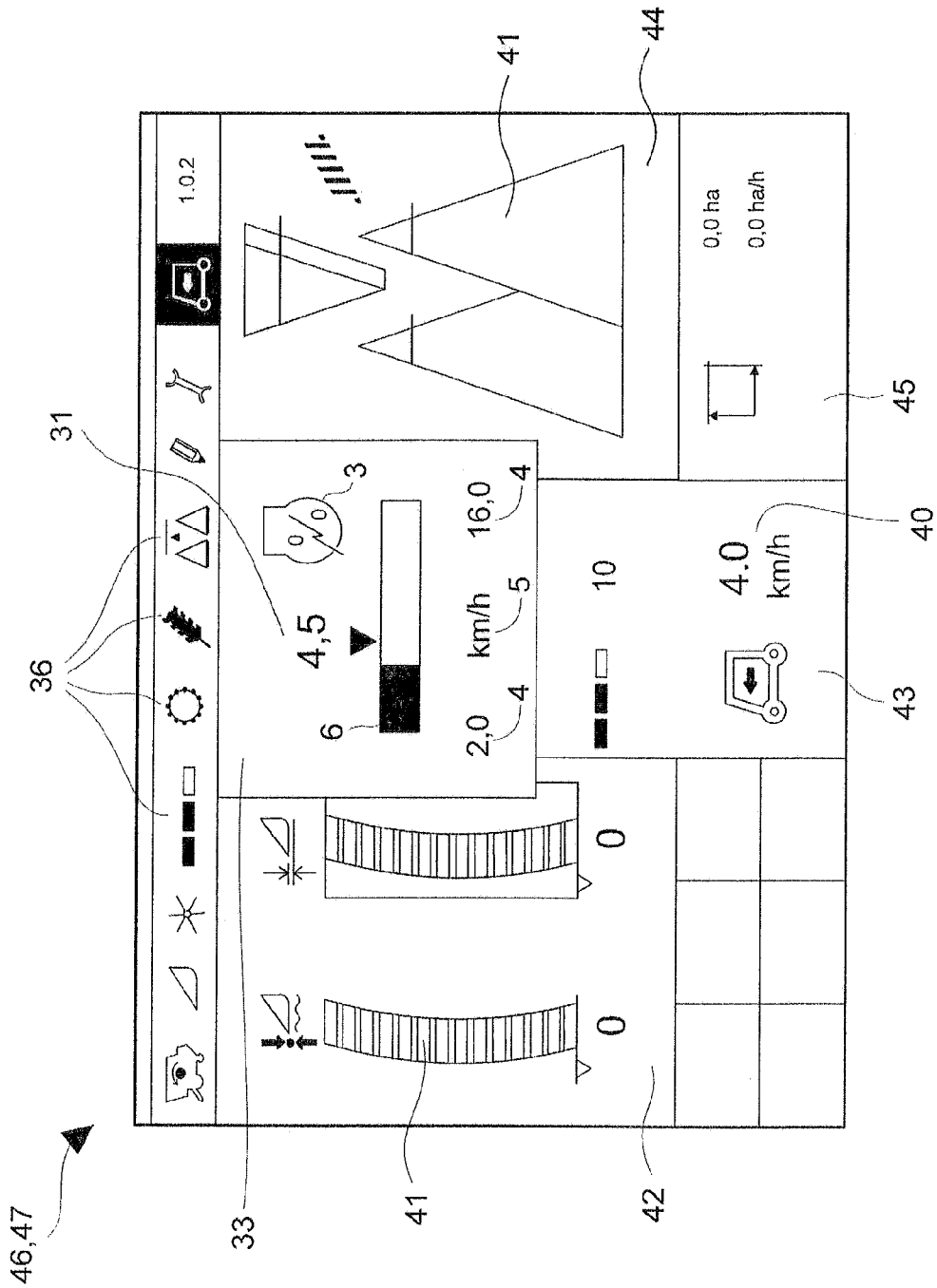
FIG. 2 shows a display layout of the display unit in a first embodiment in accordance with the present invention.

FIG. 2 shows an exemplary depiction of display 46 of display unit 47, for the case in which the automatic ground-speed control has been limited via the forward-travel regulator due to a working parameter of combine harvester 1. Basic electronic viewing screen 45 is subdivided into several areas 42, 43, 44, which display the most important information to the operator during the "in-use" mode, but also during the "non-use" mode. This transmission of information may take place using graphical display elements or numerical values 40. Various functionality windows 36 containing machine and/or crop-material parameters are displayed in top area of display 46. Functionality windows 36 need not necessarily be depicted in basic viewing screen 45 simultaneously. Instead, it may be possible to call them up via menus and submenus, in which working parameters and/or crop-material parameters may be grouped in a reasonable manner.

The operator may freely select which working parameters and/or crop-material parameters are displayed in individual functionality windows 36. Functionality windows 36 depicted in the exemplary embodiment may be adapted as needed and display "in-use" mode-specific working parameters and/or crop-material parameters of combine harvester 1, which is in the "in-use" mode. If the ground-speed control is now limited using the forward-speed regulator based on crop-material parameters and/or working parameters, an additional screen 33 that covers areas of basic viewing screen 45 for certain periods of time and in certain areas is displayed to the operator, either automatically or based on a selection made by the operator. The operator is shown, in screen 33, the control limit he defined for the maximum ground speed in the "in-use" mode as setpoint value 31, in numerical form, and as an arrow at the appropriate point of a bar 6 that represents the actual value. In addition, the possible minimum and maximum control limit 4 is displayed at the ends of bar 6, as well as particular current driving mode 5, according to which the forward-travel regulator is operated.

The notation "km/h" shown here stands for driving mode 5, "Tempomat", with which the ground speed is controlled as a function of speed using the forward-travel regulator. As an alternative, the symbol for driving mode 5 may also be displayed as a pictogram. Given that, in the exemplary embodiment, the actual speed displayed is less than setpoint value 31 of the ground speed, the operator is informed that the automatic ground-speed control is limited by the forward-travel regulator. In order to also inform the operator about which crop-material parameter and/or working parameter of the combine harvester has a limiting effect, additional screen 33 contains a pictogram 3 to this effect. As an alternative or in addition thereto, it is feasible for pictogram 3 to be displayed in any other area of display 46. In the exemplary embodiment, the operator is shown pictogram 3 for limiting the ground-speed control based on the working parameter "engine protection". "Engine protection" means, e.g., that, due to different basic conditions, the coolant used to cool internal combustion engine 18 has a high temperature, which means that effective cooling of internal combustion engine 18 may be at risk.

To protect internal combustion engine 18 from overheating, the ground speed is throttled in order to reduce the load on internal combustion engine 18 and, therefore, its cooling system, until the coolant has reached a temperature that ensures effective cooling of internal combustion engine 18. The example listed here represents a large number of possible operating states that may trigger the working parameter "engine protection" and, therefore, a limiting of the ground-speed control via the forward-speed regulator. Since the operator now knows—due to pictogram 3—that the working parameter "engine protection" limits the ground-speed control, he may counteract this limitation in a targeted manner without needing to modify the settings of further crop-material parameters and/or working parameters. The operator may counteract the limitation based on the working parameter "engine protection", e.g., by increasing the rotational speed of the cooling fan of the cooling system, and/or—if the quantity of coolant is too low—by increasing the quantity of coolant, in order to ensure effective cooling of the internal combustion engine. Due to the operator's targeted intervention, the limiting working parameter is modified such that it does not limit the automatic ground-speed control via ground speed regulator 21.

"Engine protection" also means, e.g., that internal combustion engine 18 is protected from stopping due to excessive engine depression. "Engine depression" means that the rotational speed of internal combustion engine 18 decreases due to a high load. If, e.g., the engine depression is so high, due, e.g., to the load on combine harvester 1, that there is a risk that internal combustion engine 18 could come to a standstill, forward-travel regulator 21 is limited to the extent that the ground speed is reduced. In a case such as this, the operator is then also shown pictogram 3 for the limiting working parameter "engine protection". Since the operator now knows—due to pictogram 3—that the working parameter "engine protection" limits the ground-speed control, he may counteract this limitation in a targeted manner without needing to modify the settings of further crop-material parameters and/or working parameters.

The working parameter "engine protection" described in the exemplary embodiment stands for a large number of possible crop-material parameters and/or working parameters that may limit an automatic ground-speed control via a forward-speed regulator.

Figure 3:
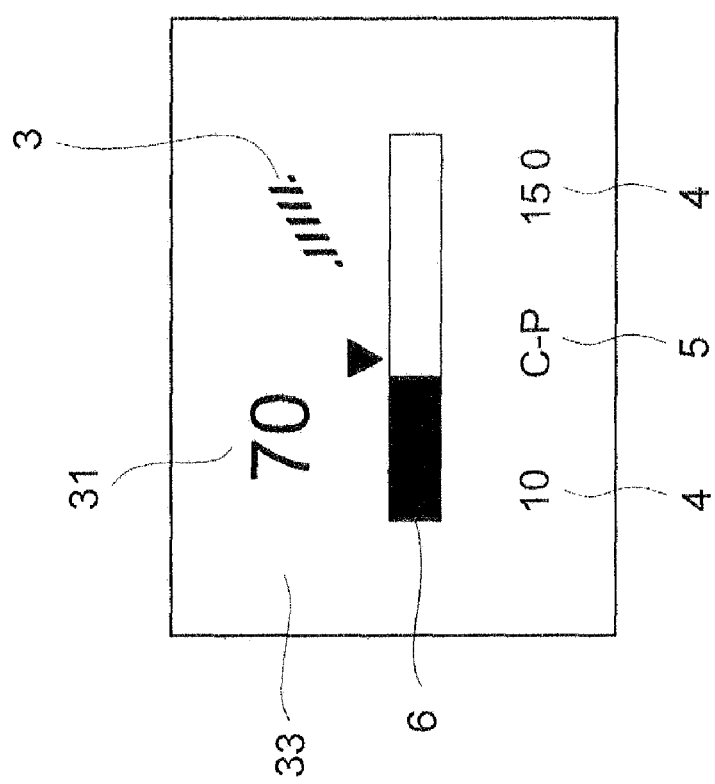
FIG. 3 shows a display layout of the display unit in a second embodiment in accordance with the present invention.

FIG. 3 shows, in an exemplary depiction, additional screen 33 shown in FIG. 2, in a second embodiment of the present invention. The operator is shown, in screen 33, the control limit he defined for the maximum layer thickness of the crop material in the feed rake of the combine harvester as setpoint value 31, in numerical form, and as an arrow at the appropriate point of a bar 6 that represents the actual value. In addition, the possible minimum and maximum control limit 4 is displayed at the ends of bar 6, as well as particular current driving mode 5, according to which the forward-travel regulator is operated. The notation "C-P" shown here stands for driving mode 5, "throughput", with which the ground speed is controlled as a function of crop-material throughput using the forward-travel regulator. The crop-material throughput is defined by the layer thickness of the crop material in the feed rake.

Given that, in the exemplary embodiment, the actual layer thickness displayed is less than setpoint value 31 of the layer thickness, the operator is informed that the automatic ground-speed control is limited by the forward-travel regulator, since the forward-travel regulator would otherwise increase the ground speed until the actual layer thickness corresponds to the layer thickness defined as setpoint value 31. In order to also inform the operator about which crop-material parameter and/or working parameter of the combine harvester has a limiting effect, additional screen 33 contains a pictogram 3 to this effect. In the exemplary embodiment, the operator is displayed pictogram 3 for limiting the ground-speed control based on the working parameter "sieve losses". "Sieve losses" means, e.g., that the control limit for the sieve losses—that is, the crop grains left on the ground, unused, by the cleaning device of the combine harvester—has been reached.

Since the control limit was reached at a lower crop-material throughput, i.e., at a lower layer thickness of the crop material in the feed rake, the forward-travel regulator is limited to the extent that it does not increase the ground speed further, which would result in a further increase in the crop-material throughput, i.e., a further increase in the layer thickness in the feed rake, which would necessarily result in a further increase in the sieve losses. Since the operator now knows—due to pictogram 3—that the working parameter "sieve losses" limits the ground-speed control, he may counteract this limitation in a targeted manner without needing to modify the settings of further crop-material parameters and/or working parameters. The operator may counteract the limitation based on the working parameter "sieve losses", e.g., by increasing the rotational speed of the cleaning fan, and/or by increasing the opening width of the sieve lamella of the cleaning sieve, and/or by modifying the control limit for the sieve losses.

Due to the operator's targeted intervention, the limiting working parameter is modified such that it does not further limit the automatic ground-speed control via the ground speed regulator.

The working parameter "sieve losses" described in the exemplary embodiment stands for a large number of possible crop-material parameters and/or working parameters that may limit an automatic ground-speed control via a forward-speed regulator.

It will be understood that each of the elements described above, or two or more together, may also find a useful application in other types of constructions differing from the types described above.

While the invention has been illustrated and described as embodied in a self-propelled agricultural working machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A self-propelled agricultural working machine, comprising:
    working units with adjustable working parameters;
    a forward-travel regulator, which includes a control and regulating unit that is connected with a plurality of sensors that monitor conditions associated with the working units and crop material and generate respective signals representative thereof, and which forward-travel regulator regulates a ground speed of the working machine as a function of one of said monitored conditions associated with one parameter selected from the group consisting of crop-material parameters, said adjustable working parameters of the working units, and both, which said one parameter, by a combine harvester setting associated with said one parameter, limits said ground speed regulated by the forward-travel regulator; and
    at least one control, operating, and display unit with which the combine harvester setting associated with said one parameter is adjustable, wherein said control, operating, and display unit directly displays said one parameter of said adjustable working parameters or said crop-material parameter that currently limits said ground speed via said forward-travel regulator, and said combine harvester setting associated therewith, in a targeted manner to an operator of the working machine, in a separate screen of said control, operating, and display unit configured to receive operator input to adjust the combine harvester setting for said one parameter of said adjustable working parameters or crop material parameter and communicate the adjusted harvester setting for said one parameter to the forward travel regulator and control and regulating unit therein.

2. A self-propelled agricultural working machine as defined in claim 1, wherein said control, operating and display unit is configured so that said at least one parameter that currently limits said ground speed via said forward-travel regulator is displayed as a pictogram in said control, operating, and display unit.

3. A self-propelled agricultural working machine as defined in claim 1, wherein said control, operating and display unit is configured so that said at least one parameter that currently limits said ground speed via said forward-travel regulator is displayed as a term in said control, operating, and display unit.

4. A self-propelled agricultural working machine as defined in claim 1, wherein said separate screen covers further screens of said control, operating, and display unit at least part of a time and in at least certain areas.

5. A self-propelled agricultural working machine as defined in claim 1, wherein said control, operating and display unit is configured so that at least one control limit selected from the group consisting of a lower control limit, an upper control limit, and a lower and upper control limit is definable for said at least one parameter.

6. A self-propelled agricultural working machine as defined in claim 5, wherein said control, operating, and display unit is configured so that said at least one control limit is effected in a manner selected from a group consisting of being entered, being changed, and both.

7. A self-propelled agricultural working machine as defined in claim 1, wherein said control, operating, and display unit is configured so that said at least parameter that currently limits said ground speed via said forward-travel regulator, and control limits defined for said particular parameter is displayed to the operator of the working machine in said control, operating, and display unit.

8. A self-propelled agricultural working machine as defined in claim 1, wherein said control, operating, and display unit is configured so that said one parameter of said working machine that limits said ground speed via said forward-travel regulator is a engine load drop.

9. A self-propelled agricultural working machine as defined in claim 1, wherein said control, operating, and display unit is configured so that said one parameter of said working machine that limits said ground speed via said forward-travel regulator is a state of an element selected from the group consisting of one or more working units, their working media, and both.

10. A self-propelled agricultural working machine as defined in claim 1, wherein said control, operating, and display unit is configured so that said one parameter of said working machine that limits said ground speed via said forward-travel regulator is a cleaning output of a crop-material cleaning device of the working machine.

11. A self-propelled agricultural working machine as defined in claim 1, wherein said control, operating, and display unit is configured so that said one parameter of said working machine that limits said ground speed via said forward-travel regulator is a separating output of a crop-material separating device of the working machine.

12. A self-propelled agricultural working machine as defined in claim 1, wherein said control, operating, and display unit is configured so that said one parameter of said working machine that limits said ground speed via said forward-travel regulator is a process of transferring a crop material to an external hauling vehicle.

13. A self-propelled agricultural working machine as defined in claim 1, wherein said control, operating, and display unit is configured so that said one parameter of said working machine that limits said ground speed via said forward-travel regulator is a distance from an end or a beginning of a row or a field detected by the working machine.

14. A self-propelled agricultural working machine as defined in claim 1, wherein said control, operating, and display unit is configured so that said one parameter of said working machine that limits said ground speed via said forward-travel regulator is a crop-material throughput delivered to the working unit of the working machine.

15. A self-propelled agricultural working machine as defined in claim 1, wherein said control, operating, and display unit is configured so that said one parameter of said working machine that limits said ground speed via said forward-travel regulator is a portion of crop grains located in a tailings device of the working machine.

16. A self-propelled agricultural working machine as defined in claim 1, wherein said control, operating, and display unit is configured so that said one parameter of said working machine that limits said ground speed via said forward-travel regulator is a volume of crop-material located in a tailings device of the working machine.

17. A self-propelled agricultural working machine as defined in claim 1, wherein said forward-travel regulator is configured so that said ground speed is always regulated automatically via said forward-travel regulator to a control limit based on said crop-material parameter or said one parameter of said working machine that has a limiting effect.

18. A self-propelled agricultural working machine as defined in claim 1, wherein the working machine is a combine harvester.

19. A self-propelled agricultural working machine as defined in claim 1, wherein the function by which the forward-travel regulator regulates the ground speed of the working machine automatically and continuously includes comparing a monitored parameter signal with a predetermined fixed signal value of each respective parameter.

\* \* \* \* \*